United States Patent
Chang et al.

(10) Patent No.: US 8,169,531 B2
(45) Date of Patent: May 1, 2012

(54) SYSTEM AND METHOD FOR AUTOMATICALLY FOCUSING AN OPTICAL LENS OF AN IMAGE MEASURING MACHINE

(75) Inventors: Chih-Kuang Chang, Taipei Hsien (TW); Li Jiang, Shenzhen (CN); Yi-Rong Hong, Shenzhen (CN); Yong-Hong Ding, Shenzhen (CN); Dong-Hai Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 337 days.

(21) Appl. No.: 12/542,819

(22) Filed: Aug. 18, 2009

(65) Prior Publication Data

US 2010/0182487 A1     Jul. 22, 2010

(30) Foreign Application Priority Data

Jan. 16, 2009   (CN) .......................... 2009 1 0300225

(51) Int. Cl.
*G03B 13/00* (2006.01)
*H04N 5/232* (2006.01)
*H04N 7/18* (2006.01)
*H04N 9/47* (2006.01)
*G06K 9/34* (2006.01)

(52) U.S. Cl. ........... 348/345; 348/136; 348/86; 382/174

(58) Field of Classification Search ............... 348/345, 348/136, 86–95; 382/174
See application file for complete search history.

(56) References Cited

U.S. PATENT DOCUMENTS

| | | | |
|---|---|---|---|
| 4,748,335 A * | 5/1988 | Lindow et al. | 250/559.22 |
| 4,920,273 A * | 4/1990 | Sacks et al. | 250/559.08 |
| 6,549,639 B1 * | 4/2003 | Genest | 382/100 |
| 7,030,351 B2 * | 4/2006 | Wasserman et al. | 250/201.3 |
| 7,119,893 B2 * | 10/2006 | Littau et al. | 356/124 |
| 7,305,114 B2 * | 12/2007 | Wolff et al. | 382/141 |
| 7,590,276 B2 * | 9/2009 | Delaney | 382/141 |
| 2005/0109959 A1 * | 5/2005 | Wasserman et al. | 250/559.19 |
| 2006/0133663 A1 * | 6/2006 | Delaney | 382/152 |
| 2009/0115883 A1 * | 5/2009 | Tsuchiya | 348/345 |

* cited by examiner

*Primary Examiner* — Tuan Ho
*Assistant Examiner* — Christopher K Peterson
(74) *Attorney, Agent, or Firm* — Altis Law Group, Inc.

(57) ABSTRACT

A system and method for automatically focusing an optical lens controls the light generated by a light-emitting device of an image measuring machine to penetrate a glass sheet, so as to project a picture of the glass sheet onto an object. The system and method further moves an optical lens along a Z-axis of the image measuring machine to capture one or more digital images of the object, and computes a definition value of each captured digital image. Furthermore, the system and method obtains a focus position corresponding to the highest definition value of the captured digital image.

11 Claims, 4 Drawing Sheets

SYSTEM AND METHOD FOR AUTOMATICALLY FOCUSING AN OPTICAL LENS OF AN IMAGE MEASURING MACHINE

BACKGROUND

1. Technical Field

Embodiments of the present disclosure relate to the field of image measurement, and more particularly to a system and method for automatically focusing an optical lens of an image measuring machine.

2. Description of Related Art

A charged coupled device (CCD) is an electrical device that is used to capture images of objects, store information (analogous to the way a computer stores information), or transfer electrical charge (as part of a larger device). CCDs are used in a variety of different imaging devices, such as imagers, CCD cameras or scanners. CCDs are only part of the whole device. To capture images of an object, an optical lens needs to be properly focused on the object.

One such image measuring machine includes a focusing apparatus for adjusting the optical lens to focus on the object, so as to obtain clear digital images of the object for measurement. Generally, a user determines a focus of the optical lens according to the gray value of the captured digital image of the object. However, if the surface of the object is very smooth, the captured digital images will not be clear. As a result, the precision of focusing will directly be affected, which wastes time and reduces productivity.

Therefore, there is a need for a system and method to overcome the aforementioned problem.

DETAILED DESCRIPTION

All of the processes described below may be embodied in, and fully automated via, function modules executed by one or more general purpose processors of a computer. Some or all of the methods may alternatively be embodied in specialized hardware. The function modules may be stored in any type of computer-readable medium or other computer storage device.

Figure 1:
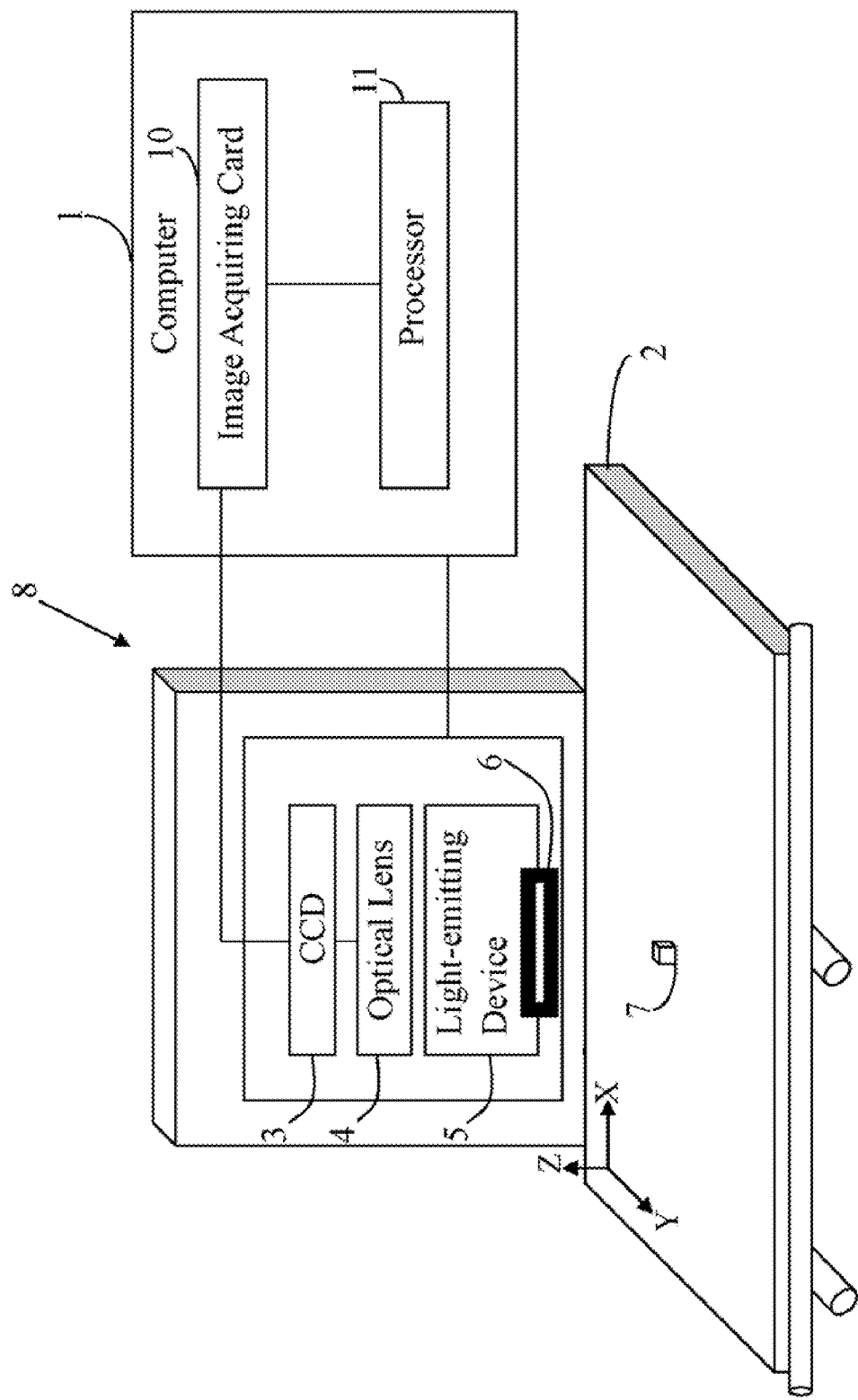
FIG. 1 is a block diagram of one embodiment of a system for automatically focusing an optical lens of an image measuring machine.

FIG. 1 is a block diagram of one embodiment of a system 8 for automatically focusing an optical lens 4 of an image measuring machine 2. In one embodiment, the system 8 may comprise a computer 1 and the image measuring machine 2 connected to the computer 1. The computer 1 may comprise a plurality of peripherals and devices such as a display device electronically connected to the computer 1. An object 7 (e.g., a component of a mobile phone) may be positioned on a work platform of the image measuring machine 2. A charge coupled device (CCD) 3 is movable along a Z-axis of the image measuring machine 2, to capture consecutive digital images of the object 7 using the optical lens 4 which is positioned in front of the CCD 3. The light-emitting device 5 may be positioned on the Z-axis of the image measuring machine 2, to emit light. In one embodiment, the light-emitting device 5 may be a laser or a light-emitting diode (LED). A glass sheet 6 is installed in the image measuring machine 2. The glass sheet 6 includes a picture which can be projected on the object 7.

The computer 1 may comprise an image acquiring card 10 electronically connected to the CCD 3. The CCD 3 transfers the digital images to the computer 1 through the image acquiring card 10.

Figure 2:
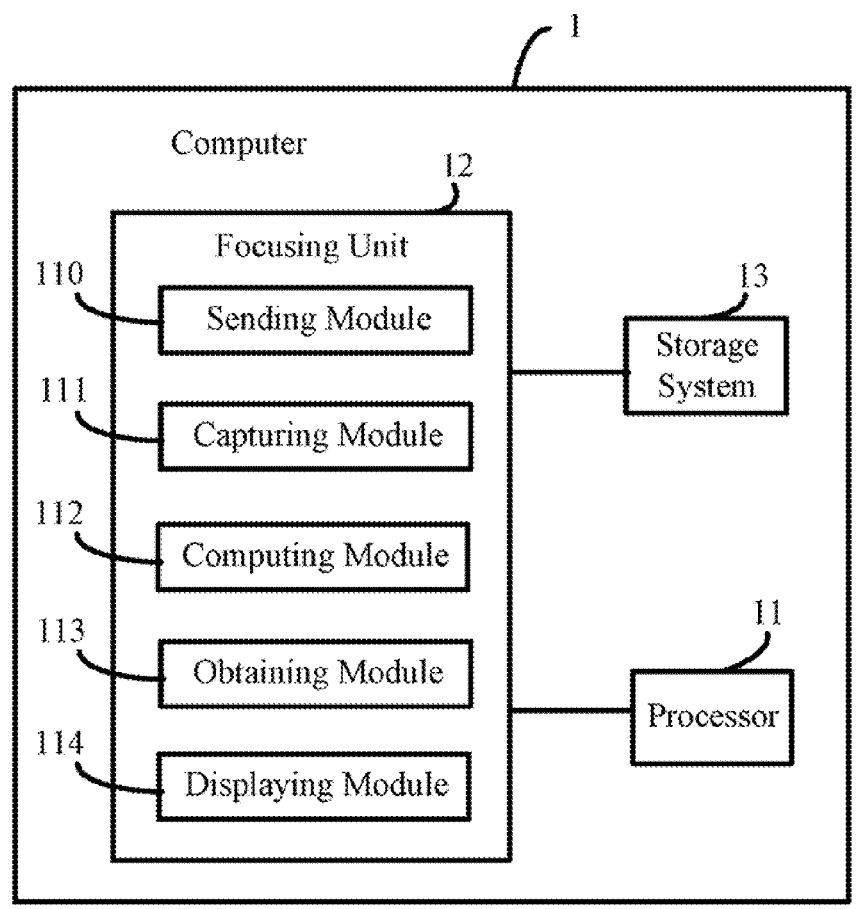
FIG. 2 is a block diagram of one embodiment of a computer in FIG. 1.

FIG. 2 is a block diagram of one embodiment of the computer 1 in FIG. 1. The computer 1 includes a focusing unit 12. In one embodiment, the focusing unit 12 includes a driving module 110, a capturing module 111, a computing module 112, an obtaining module 113, and a displaying module 114. One or more computerized codes of the modules 110-114 are stored in the storage system 13. One or more general purposes or specialized processors, such as a processor 11 executes the computerized codes of the modules 110-114 to provide one or more operations of the focusing unit 12.

The driving module 110 drives the light-emitting device 4 to emit light, and controls the light to penetrate the glass sheet 6, so as to project the picture of the glass sheet 6 onto the object 7.

The capturing module 111 moves the optical lens 4 along the Z-axis to capture one or more digital images of the object 7. In one embodiment, the capturing module 111 moves the optical lens 4 along the Z-axis within a user-predetermined range, such as [0 millimeters (mm), −20 mm], for example.

Figure 4:
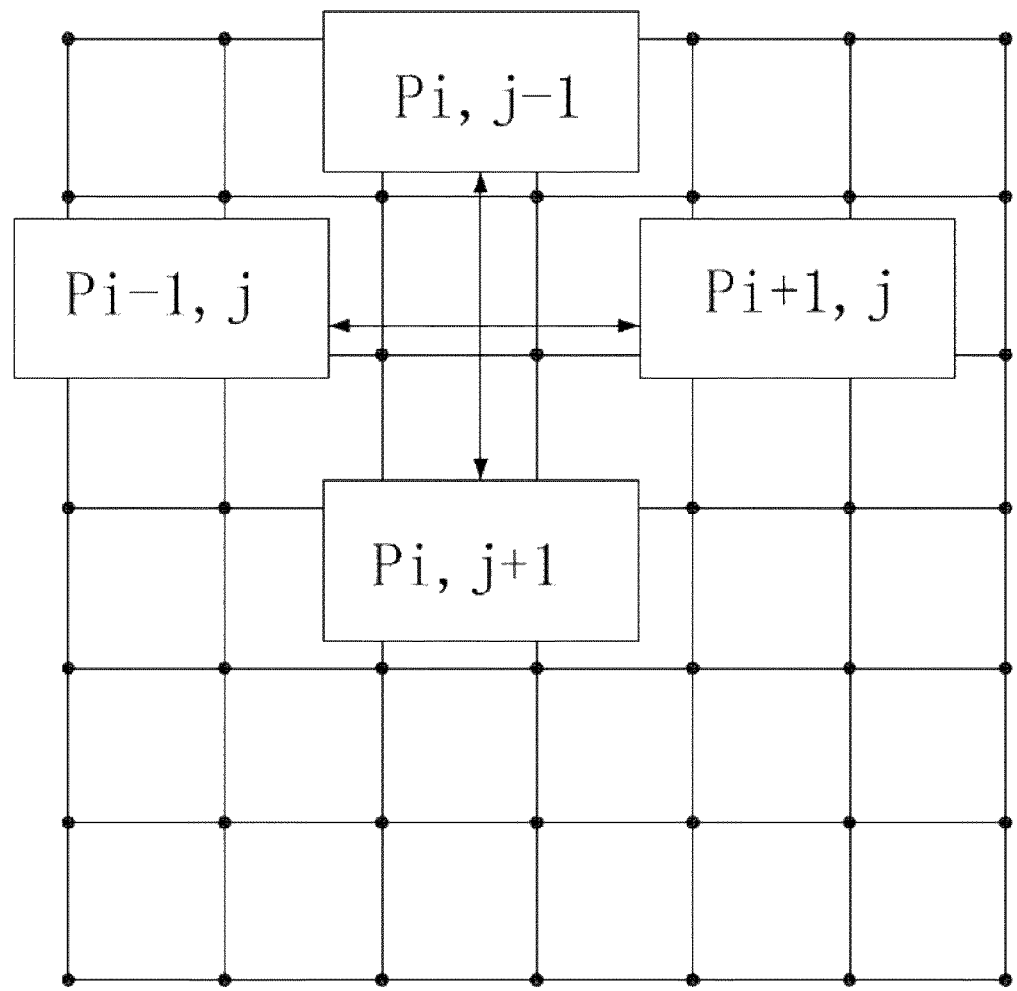
FIG. 4 is an amplified diagram of a digital image.

The computing module 112 computes a definition value of each captured digital image. As shown in FIG. 4, an amplified diagram of a digital image that is made of a plurality of pixels is provided. It is noted that each pixel in the digital image has a gray value. Each definition value indicates the definition of each captured digital image.

One embodiment of a formula for computing a definition value for each captured digital image is described as follows: (1) the computing module 112 reads four random pixels that are nearest to each other (referring to FIG. 4); (2) the computing module 112 calculates a total S of all the pixels of the captured digital image; (3) the computing module 112 reads four gray values $P_{i,j-1}$, $P_{i,j+1}$, $P_{i-1,j}$ and $P_{i+1,j}$ of the four pixels from the captured digital image as mentioned above; and (4) using the formula:

$$G = \frac{\sum_{i=1}^{n}\sum_{j=1}^{n}(|P_{i,j-1} - P_{i-1,j}| + |P_{i-1,j} - P_{i+1,j}|)}{S}$$

The function G is a formula for computing definition value of each captured digital image.

The obtaining module 113 obtains a focus position corresponding to a captured digital image having the highest definition value. In one embodiment, each digital image is captured at a different position along the Z-axis. The captured digital image will be most clear if the optical lens 4 is positioned at the focus position.

The displaying module 114 moves the optical lens 4 to the focus position and displays the focus position on the display device of the computer 1.

Figure 3:
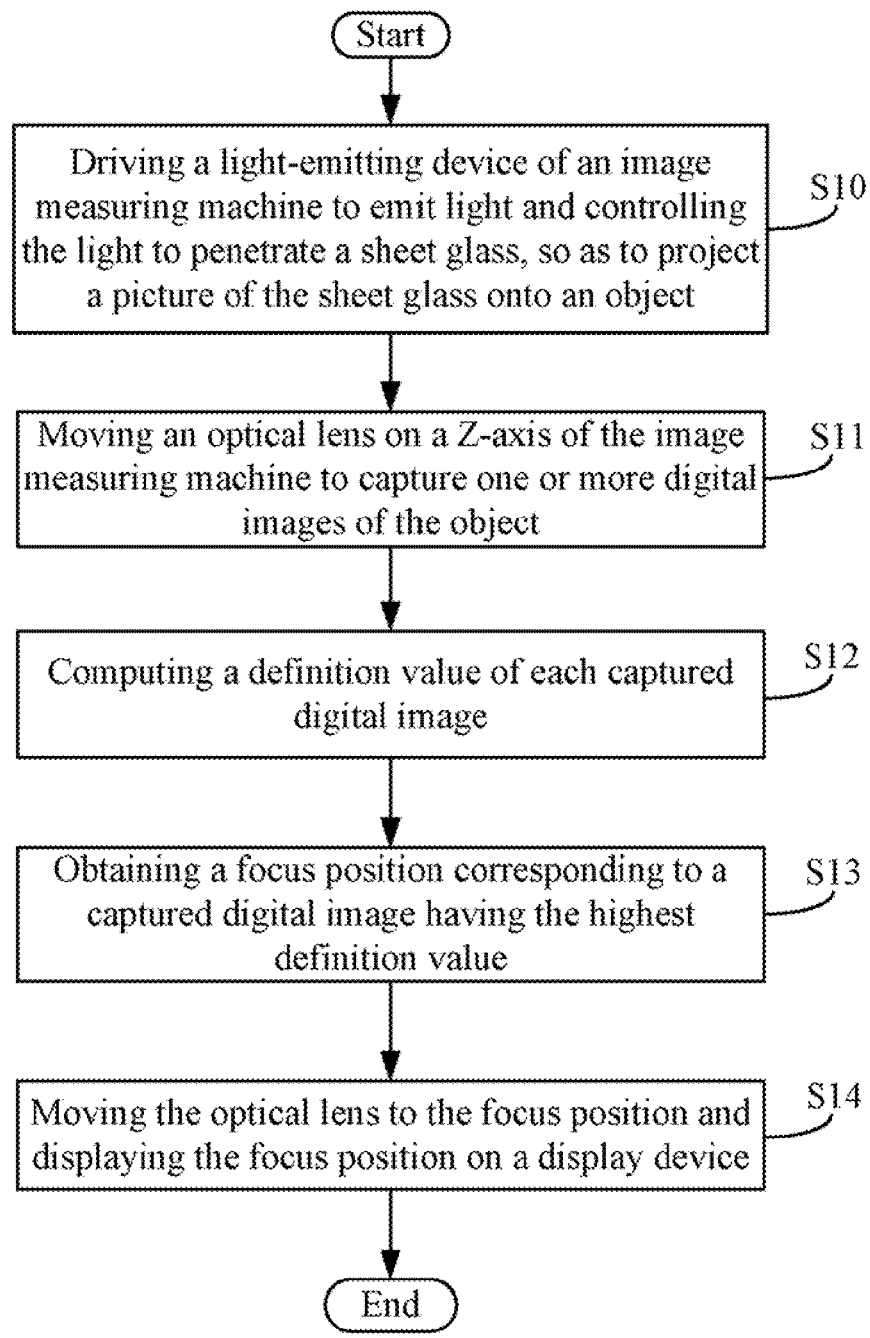
FIG. 3 is a flowchart of one embodiment of a method for automatically focusing the optical lens of the image measuring machine.

FIG. 3 is a flowchart of one embodiment of a method for automatically focusing the optical lens of the image measuring machine. Depending on the embodiment, additional blocks may be added, others removed, and the ordering of the blocks may be changed.

In block S10, the driving module 110 drives the light-emitting device 4 to emit light, and controls the light to penetrate the glass sheet 6, so as to project the picture of the glass sheet 6 onto the object 7.

In block S11, the capturing module 111 moves the optical lens 4 along a Z-axis to capture one or more digital images of the object 7.

In block S12, the computing module 112 computes a definition value of each captured digital image. As shown in FIG. 4, an amplified diagram of a digital image that is made of a plurality of pixels is provided. It is noted that each pixel in the digital image has a gray value. Each definition value indicates the definition of each captured digital image.

One embodiment of a formula for computing a definition value for each captured digital image is described as follows: (1) the computing module 112 reads four random pixels that are nearest to each other (referring to FIG. 4); (2) the computing module 112 calculates a total S of all the pixels of the captured digital image; (3) the computing module 112 reads four gray values $P_{i,j-1}, P_{i,j+1}, P_{i-1,j}$ and $P_{i+1,j}$ of the four pixels from the captured digital image as mentioned above; (4) using the function G as mentioned above, a definition value of each captured digital image is computed.

In block S13, the obtaining module 113 obtains a focus position corresponding to a captured digital image having the highest definition value. As mentioned above, each digital image is captured at a different position along the Z-axis. For example, assuming that the CCD 3 captures one hundred digital images within the user-predetermined range [0 mm, −20 mm], then the obtaining module 113 compares the definition values of the one hundred digital images one by one to obtain the captured digital image having the highest definition value. The focus position is the position where the captured digital image having the highest definition value is captured.

In block S14, the displaying module 114 moves the optical lens 4 to the focus position and displays the focus position on a display device of the computer 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for automatically focusing an optical lens of an image measuring machine, the system comprising a storage system storing a plurality of programs and a processor that executes one or more operations for the plurality of programs, the programs comprising:
    a driving module operable to drive a light-emitting device of the image measuring machine to emit light, and control the light to penetrate a glass sheet, so as to project a picture of the glass sheet onto an object, wherein the object is positioned on a work platform of the image measuring machine;
    a capturing module operable to move the optical lens along a Z-axis of the image measuring machine, so as to capture one or more digital images of the object; a computing module operable to compute a definition value of each captured digital image, wherein the definition value is computed as follows:

$$G = \frac{\sum_{i=1}^{n} \sum_{j=1}^{n} (|P_{i,j-1} - P_{i-1,j}| + |P_{i-1,j} - P_{i+1,j}|)}{S},$$

wherein $P_{i,j}$ is a gray value of a pixel and S is a total of all the pixels of a captured digital image; and
an obtaining module operable to obtain a focus position corresponding to a captured digital image having the highest definition value.

2. The system of claim 1, wherein the light-emitting device is a laser or a light-emitting diode (LED).

3. The system of claim 1, further comprising a displaying module operable to move the optical lens to the focus position and display the focus position on a display device.

4. A computer-based method for automatically focusing an optical lens of an image measuring machine, the method comprising:
    driving a light-emitting device of the image measuring machine to emit light, and controlling the light to penetrate a glass sheet, so as to project a picture of the glass sheet onto an object, wherein the object is positioned on a work platform of the image measuring machine;
    moving the optical lens along a Z-axis of the image measuring machine to capture one or more digital images of the object;
    computing a definition value of each captured digital image, wherein the definition value is computed as follows:

$$G = \frac{\sum_{i=1}^{n} \sum_{j=1}^{n} (|P_{i,j-1} - P_{i-1,j}| + |P_{i-1,j} - P_{i+1,j}|)}{S},$$

wherein $P_{i,j}$ is a gray value of a pixel and S is a total of all the pixels of a captured digital image; and
obtaining a focus position corresponding to a captured digital image having the highest definition value.

5. The method of claim 4, wherein the light-emitting device is a laser or a light-emitting diode (LED).

6. The method of claim 4, further comprising:
    moving the optical lens to the focus position and displaying the focus position on a display device.

7. The method of claim 4, wherein the block of computing the definition value for each captured digital image comprises:
    (a) selecting four nearest pixels of the captured digital image;
    (b) calculating a number S of all the pixels of the captured digital image;
    (c) reading four gray values $P_{i,j-1}, P_{i,j+1}, P_{i-1,j}$ and $P_{i+1,j}$ of the four pixels from the captured digital image;
    (d) repeating blocks (a)-(c) until the gray values of all the pixels of the captured digital image are read; and
    (e) computing a definition value G of the captured digital image according to the gray values of all the pixels and the number S of all the pixels of the captured digital image.

8. A non-transitory computer-readable medium having stored thereon instructions for that, when executed by a computer, causing the computer to perform a method for automatically focusing an optical lens of an image measuring machine, the method comprising:

driving a light-emitting device of the image measuring machine to emit light, and controlling the light to penetrate a glass sheet, so as to project a picture of the glass sheet onto an object, wherein the object is positioned on a work platform of the image measuring machine;

moving the optical lens along a Z-axis of the image measuring machine to capture one or more digital images of the object;

computing a definition value of each captured digital image, wherein the definition value is computed as follows:

$$G = \frac{\sum_{i=1}^{n}\sum_{j=1}^{n}(|P_{i,j-1} - P_{i-1,j}| + |P_{i-1,j} - P_{i+1,j}|)}{S},$$

wherein $P_{i,j}$ is a gray value of a pixel and S is a total of all the pixels of a captured digital image; and obtaining a focus position corresponding to a captured digital image having the highest definition value.

9. The non-transitory medium of claim 8, wherein the light-emitting device is a laser or a light-emitting diode (LED).

10. The non-transitory medium of claim 8, wherein the method further comprises:
moving the optical lens to the focus position and displaying the focus position on a display device.

11. The non-transitory medium of claim 8, wherein the block of computing the definition value for each captured digital image comprises:
(a) selecting four nearest pixels of the captured digital image;
(b) calculating a number S of all the pixels of the captured digital image;
(c) reading four gray values $P_{i,j-1}$, $P_{i,j+1}$, $P_{i-1,j}$ and $P_{i-1,j}$ of the four pixels from the captured digital image;
(d) repeating blocks (a)-(c) until the gray values of all the pixels of the captured digital image are read; and
(e) computing a definition value G of the captured digital image according to the gray values of all the pixels and the number S of all the pixels of the captured digital image.

* * * * *